United States Patent
Flores Tapia

(10) Patent No.: US 12,154,314 B2
(45) Date of Patent: Nov. 26, 2024

(54) SEMANTIC SEGMENTATION BASED CLUSTERING

(71) Applicant: GM Cruise Holdings LLC, San Francisco, CA (US)

(72) Inventor: Daniel Flores Tapia, Fairfield, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 335 days.

(21) Appl. No.: 17/553,505

(22) Filed: Dec. 16, 2021

(65) Prior Publication Data
US 2023/0196728 A1    Jun. 22, 2023

(51) Int. Cl.
| | |
|---|---|
| *G06V 10/762* | (2022.01) |
| *G06T 7/70* | (2017.01) |
| *G06V 10/764* | (2022.01) |
| *G01S 13/86* | (2006.01) |
| *G01S 13/89* | (2006.01) |

(52) U.S. Cl.
CPC .............. *G06V 10/763* (2022.01); *G06T 7/70* (2017.01); *G06V 10/764* (2022.01); *G01S 13/865* (2013.01); *G01S 13/89* (2013.01); *G06T 2207/10028* (2013.01); *G06T 2207/30252* (2013.01)

(58) Field of Classification Search
CPC ......... G01S 13/89; G01S 13/865; G06T 7/70; G06T 2207/10028; G06T 2207/30252; G06V 10/763; G06V 10/764
See application file for complete search history.

(56) References Cited

U.S. PATENT DOCUMENTS

2022/0111859 A1*   4/2022   Lu ..................... G01C 21/3453
2022/0357441 A1*   11/2022   Ansari ................. G01S 13/865

OTHER PUBLICATIONS

Zhang, et al. (Computer English Translation of WIPO Patent WO 2020/199173 A1), pp. 1-25. (Year: 2020).*
Shen, et al. (Radar Pont Cloud Clustering Method Based on Optimization (See entire document), pp. 158-162. (Year: 2021).*
Computer English Translation of Chinese Pat. No. CN108921925 A, pp. 1-27 (Year: 2018).*
Computer English Translation of Chinese Pat. No. CN110738223 A, pp. 1-11 (Year: 2020).*

\* cited by examiner

*Primary Examiner* — Daniel G Mariam
(74) *Attorney, Agent, or Firm* — Michael DiCato

(57) ABSTRACT

The disclosed technology provides solutions for improving perception systems and in particular for improving object identification based on sensor point cloud data, such as radar point cloud data. A process of the disclosed technology can include steps for receiving point cloud data comprising a plurality of radar points, wherein each of the radar points corresponds with a first object or a second object in an environment, generating a semantic label for each of the radar points, and clustering the plurality of radar points based on the semantic label for each of the radar points, to generate a first point cloud cluster for the first object and a second point cloud cluster for the second object. Systems and machine-readable media are also provided.

17 Claims, 5 Drawing Sheets

SEMANTIC SEGMENTATION BASED CLUSTERING

BACKGROUND

1. Technical Field

The disclosed technology provides solutions for improving perception systems and in particular for improving object identification based on sensor point cloud data, such as radar point cloud data.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning and obstacle avoidance.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

Figure 1:
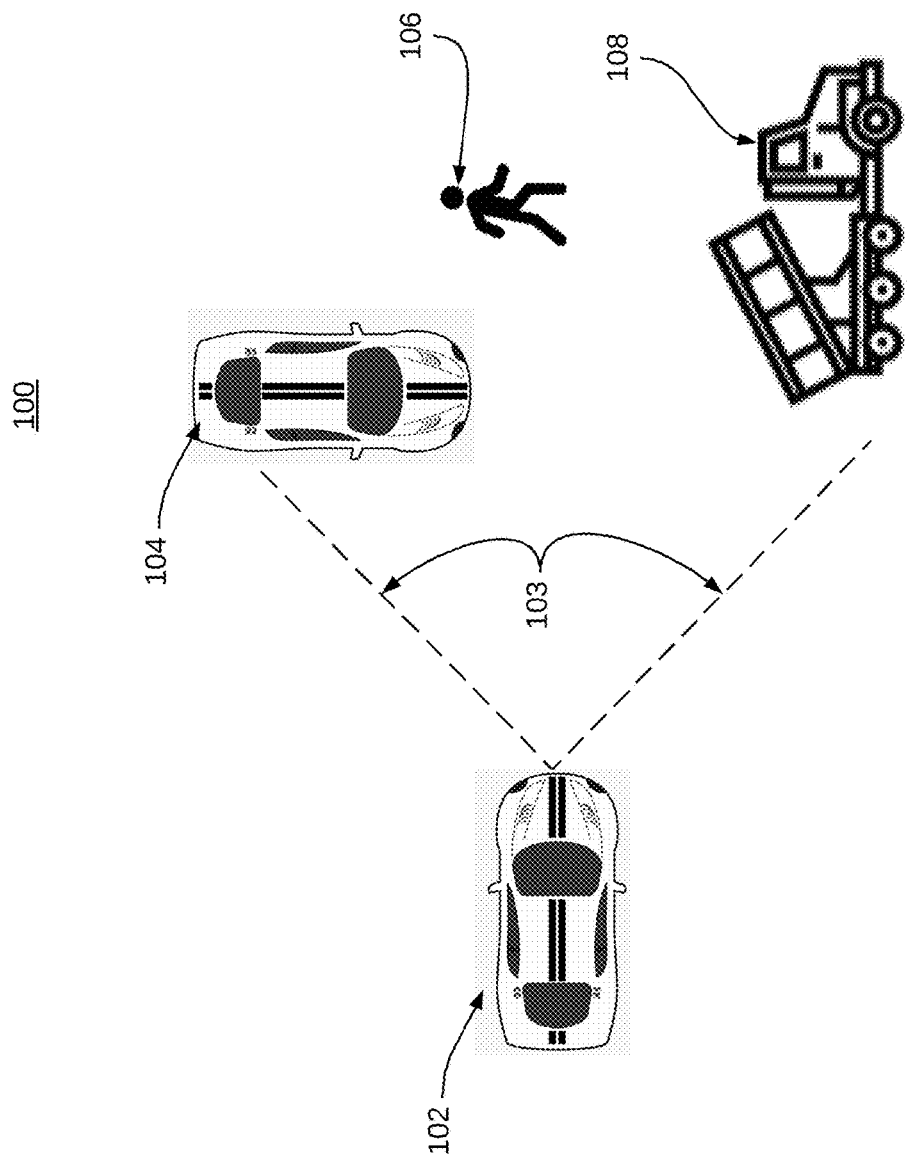
FIG. 1 conceptually illustrates an example environment in which sensor point cloud data can be collected, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Perception systems of autonomous vehicles (AVs) are designed to detect various objects in the surrounding environment in order to execute effective navigation and planning operations. To facilitate navigation and routing decisions, such systems are designed to identify a correspondence between collected sensor data, and various objects in the environment. For example, collected point cloud data for radar or Light Detection and Ranging (LiDAR) sensors can be grouped or clustered based on the correspondence between various point cloud data points, and objects to which each point is associated. In some conventional clustering methods, point cloud data can be clustered to determine which points share a spatial association, and then semantic representations of an associated object can be determined. However, conventional clustering techniques may not perform accurately where two objects are close together, such as in instances where the field-of-view (FOV) of one object is partially occluded by another object. By way of example, it can be difficult to accurately cluster radar or LiDAR point cloud data in instances where a pedestrian or other object, such as another Vulnerable Road User (VRU), is close to another object, such as a vehicle.

Aspects of the disclosed technology address shortcomings of conventional clustering techniques by utilizing semantic data when performing point cloud clustering. In some aspects, semantic labels can be generated and associated with point cloud data, for example, on a per-point basis, and used as an input when clustering is performed. For example, semantic labels, such as those associated with radar and/or LiDAR data points, can be used by distance-based clustering algorithms, such as a Density-based Spatial Clustering of Applications with Noise (DBSCAN) algorithm, to perform clustering. In some aspects, semantic labels (also: semantic tags), can be used to adapt various parameters of the applied clustering technique, such as by increasing or decreasing radial distance parameters to accommodate the type of object (or objects) represented in the point cloud data.

By performing clustering using additional information provided by semantic labels, the performance of spatial clustering techniques can be improved, thereby enabling higher-resolution object identification. Such techniques can improve the performance of perception systems, such as those utilized by autonomous vehicles (AVs), in instances where proximately located objects (e.g., vehicles and pedestrians) are detected by AV sensors.

FIG. 1 conceptually illustrates an example environment 100 in which sensor point cloud data can be collected, e.g., by a radar and/or LiDAR sensor. In the example of FIG. 1, an AV 102 can acquire radar and/or LiDAR point cloud data from a field-of-view 103 of various vehicle sensors (not illustrated). In the illustrated example, AV 102 can collect radar and/or LiDAR point cloud data associated with vehicle 104, pedestrian 106, and truck 108. It is understood that various other objects, including but not limited to additional vehicles, VRUs and/or other objects, may be represented in the collected point cloud data, without departing from the scope of the disclosed technology.

In the example of environment 100, conventional perception systems may have difficulty distinguishing/clustering point cloud data corresponding to vehicle 104 from point cloud data corresponding to pedestrian 106. To improve (increase) the resolution of point cloud clustering, in some approaches, semantic labels may be associated with point cloud data before clustering is performed. Semantic labels can be associated with each point in the point cloud before clustering is performed. With the addition of per-point semantic labels, the resolution of distance-based clustering algorithms (e.g., DBSCAN) can be increased. As discussed in further detail with respect to FIGS. 2 and 3, semantic labels can be determined using machine-learning (ML) based detection techniques. In some aspects, semantic labels can be used to adapt clustering parameters. For example, semantic labels associated with large objects, such as heavy vehicles or objects with a relatively large footprint (e.g. truck 108) may be used to modify one or more clustering parameters, such as by increasing a clustering radius. In a similar manner, semantic labels associated with relatively smaller objects, such as pedestrians or bicycles with a relatively small footprint (e.g., pedestrian 106) may be used to modify one clustering parameters, such as by reducing a clustering radius. In some instances, additional information, such as localization information associated with each point in the point cloud, may also be used to increase clustering resolution. With respect to the example of FIG. 1, with the benefit of added semantic labels, radar points associated with pedestrian 106 may be more accurately grouped (clustered) to represent the associated pedestrian, as opposed to being incorrectly associated with vehicle 104.

Figure 2:
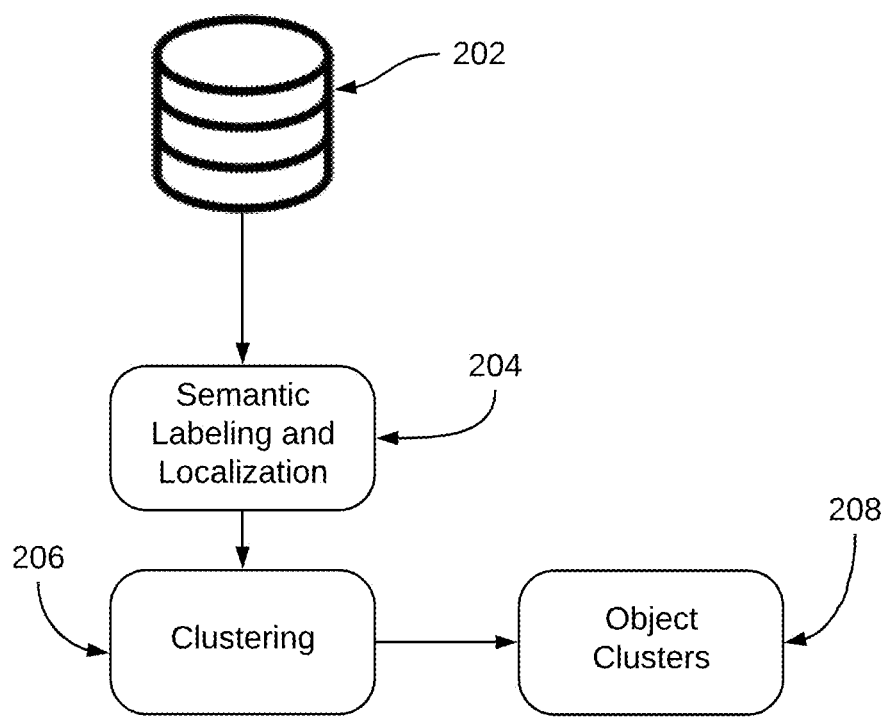
FIG. 2 illustrates an example system for clustering point cloud data, according to some aspects of the disclosed technology.

FIG. 2 illustrates an example system 200 for clustering point cloud data, according to some aspects of the disclosed technology. In the example of system 200, database 202 represents a data store of point cloud data, including but not limited to radar and/or LiDAR point cloud data corresponding with various objects in an environment. In some approaches, database 202 can represent a store of sensor data collected from one or more sensors of a single vehicle, such as an autonomous vehicle, or from multiple vehicles, such as for two or more AVs in an AV fleet.

At block 204, point cloud data (e.g., radar point cloud data) is received from database 202, e.g., by a machine-learning model. Semantic labels are then generated and associated with the point cloud data, e.g., on a per-point basis. Localization information can also be determined and associated with the point cloud data. By way of example, for radar point cloud data including a multitude of radar points/values, semantic label and/or localization information can be associated with each point, i.e., indicating an associated object and/or precise position information for the corresponding point.

Once the point cloud data has been pre-processed to include semantic labels, the point cloud data can be clustered, e.g., to determine which points within the cloud are can be associated/grouped (block 206). Although clustering may be performed using various different clustering algorithms or approaches, in some instances, a distance-based clustering algorithm, such as DBSCAN, may be used. By utilizing the additional information provided by the semantic labels and/or localization information, clustering resolution can be improved, thereby enabling AV perception systems to more accurately distinguish between closely positioned objects.

Referring to the example illustrated with respect to FIG. 1, sensor point cloud data corresponding with vehicle 104 may be augmented to include the semantic label "vehicle" or "traffic participant," whereas point cloud data corresponding with pedestrian 106 may be augmented to include semantic metadata labels such as "pedestrian" or "VRU," etc. By utilizing the additional information provided by the semantic and/or localization labels, clustering resolutions can be increased. Once clustering is complete, the generated clusters can be provided as output (block 208).

Figure 3:
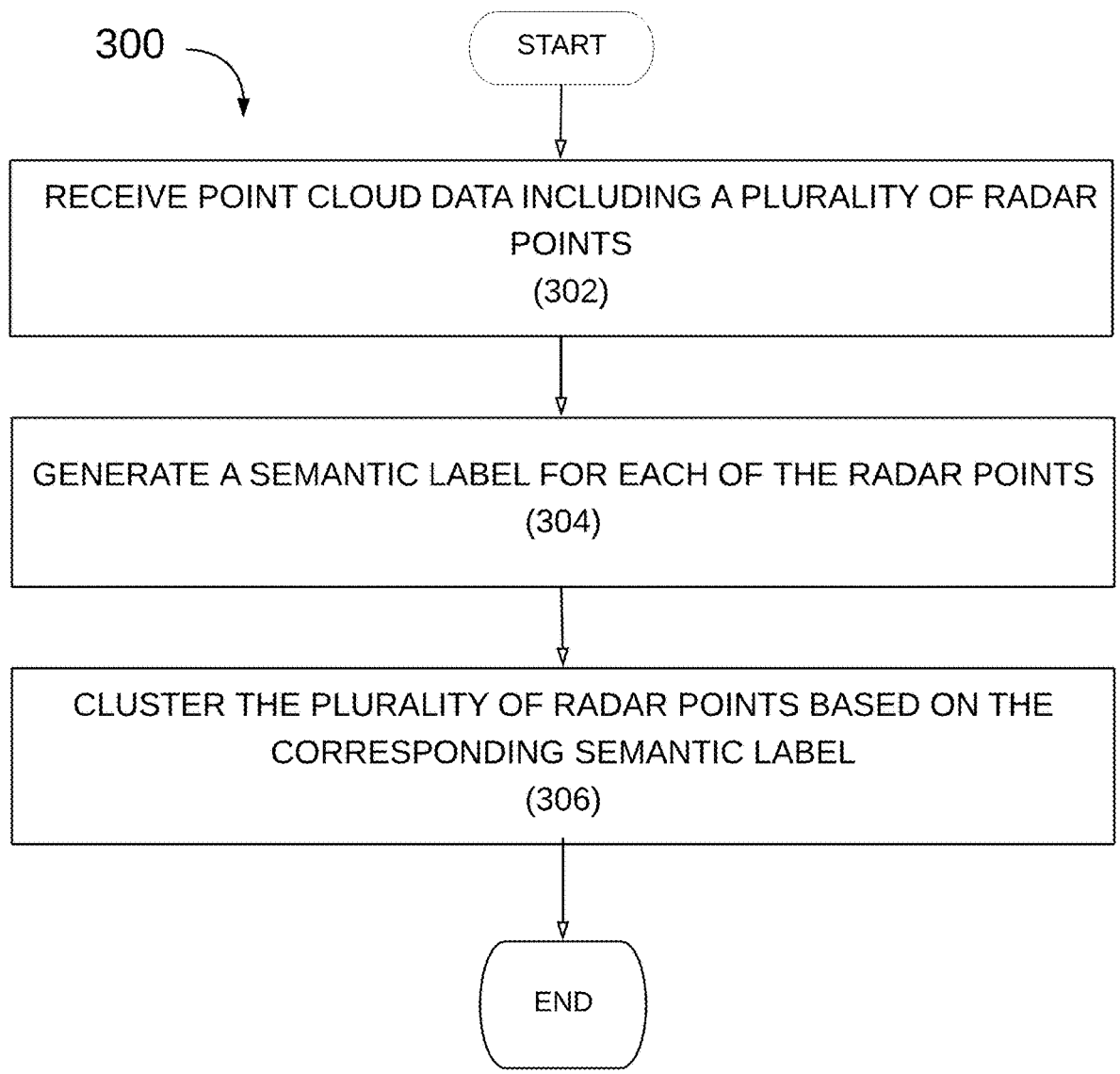
FIG. 3 illustrates a flow diagram of an example process for clustering point cloud data, according to some aspects of the disclosed technology.

FIG. 3 illustrates a flow diagram of an example process 300 for clustering radar point cloud data. At step 302, the process 300 can include receiving point cloud data including a plurality of radar points, wherein each of the radar points corresponds with a first object or a second object in an environment. Further to the example discussed with respect to FIG. 1, above, the point cloud data corresponding with the first object can be point cloud data associated with vehicle 104, whereas the point cloud data corresponding with the second object can be point cloud data associated with pedestrian 106, or truck 108.

At step 304, the process includes generating a semantic label for each of the radar points. In some implementations, semantic labels may be generated using a machine-learning (ML) based classification system. By way of example, the ML based classification system may consume other types of data, e.g., camera image data, for a corresponding portion of the environment, for use in generating semantic labels. In some approaches, semantic labels can be generated on a per-point basis, e.g., whereby semantic metadata is associated with specific points from the point cloud. In such approaches, the ML classification system can be one that has been trained to perform object classifications based on input point cloud data. For example, the ML classification system can be (or can include) one or more layers of a machine learning network that have been trained using a training data set including ground-truth object-label/point-cloud data pairs.

At step 306, the process 300 can include clustering the plurality of radar points based on the semantic label for each of the radar points, e.g., to generate a first point cloud cluster for the first object and a second point cloud cluster for the second object. In some approaches, a distance-based clustering approach/algorithm may be used. In such instances, a resolution of the clustering associations with different objects (e.g., the first object and the second object) in the environment may be improved/increased. For example, by utilizing semantic labels, data points in the point cloud that are proximately located (e.g., close in distance), may be associated with different clusters based on their corresponding semantic labels. In this manner, closely situated but distinct objects, such as vehicle 104 and pedestrian 106, in the example of FIG. 1, may be distinguished by the generated object clusters.

Figure 4:
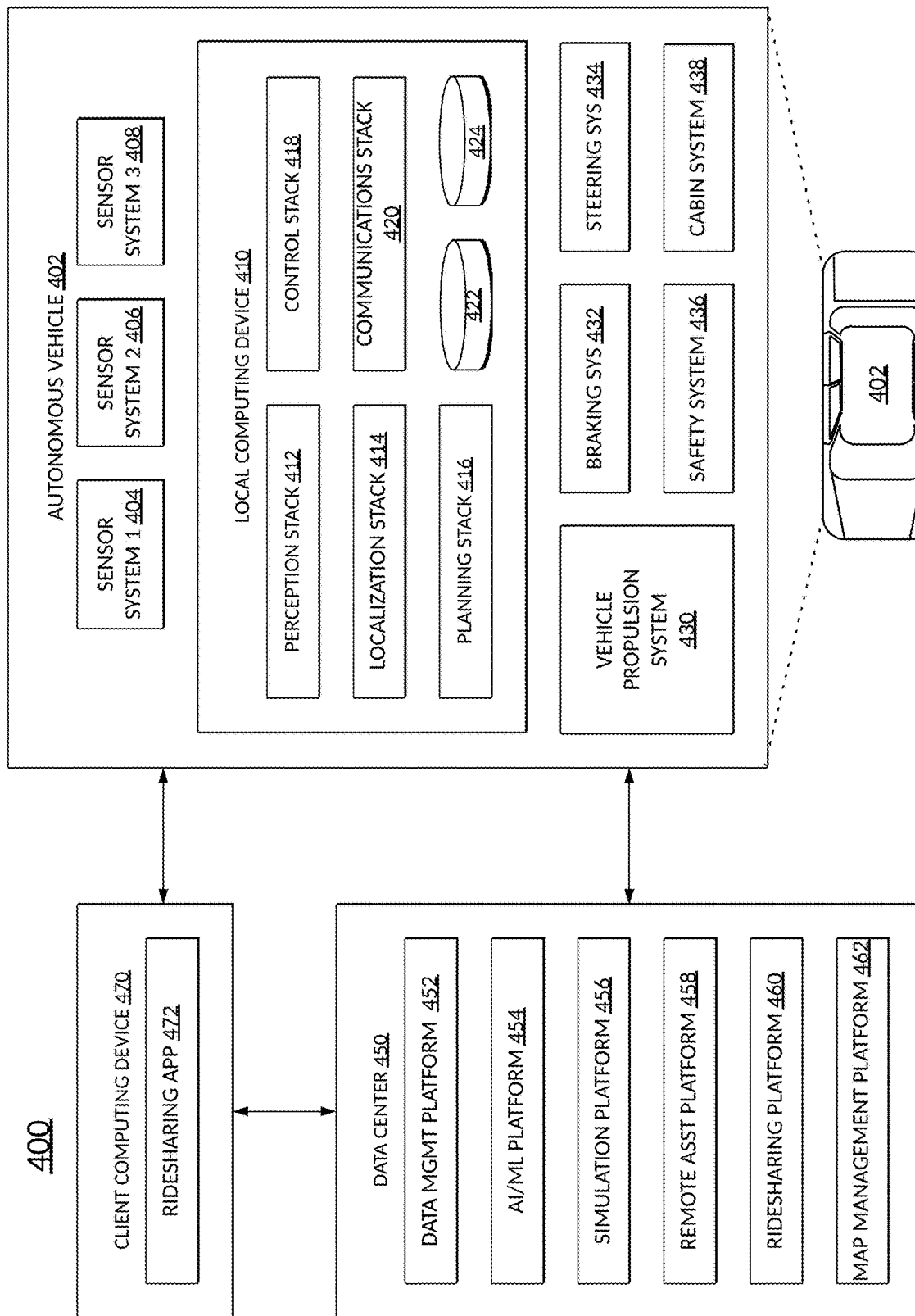
FIG. 4 illustrates an example system environment that can be used to facilitate AV dispatch and operations, according to some aspects of the disclosed technology.

Turning now to FIG. 4 illustrates an example of an AV management system 400. One of ordinary skill in the art will understand that, for the AV management system 400 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

AV management system 400 includes an AV 402, a data center 450, and a client computing device 470. The AV 402, the data center 450, and the client computing device 470 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 402 can navigate about roadways without a human driver based on sensor signals generated by multiple sensor systems 404, 406, and 408. The sensor systems 404-408 can include different types of sensors and can be arranged about the AV 402. For instance, the sensor systems 404-408 can comprise Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 404 can be a camera system, the sensor system 406 can be a LIDAR system, and the sensor system 408 can be a RADAR system. Other embodiments may include any other number and type of sensors.

AV 402 can also include several mechanical systems that can be used to maneuver or operate AV 402. For instance, the mechanical systems can include vehicle propulsion system 430, braking system 432, steering system 434, safety system 436, and cabin system 438, among other systems. Vehicle propulsion system 430 can include an electric motor, an internal combustion engine, or both. The braking system 432 can include an engine brake, brake pads, actuators, and/or any other suitable componentry configured to assist in decelerating AV 402. The steering system 434 can include suitable componentry configured to control the direction of movement of the AV 402 during navigation. Safety system 436 can include lights and signal indicators, a parking brake, airbags, and so forth. The cabin system 438 can include cabin temperature control systems, in-cabin entertainment systems, and so forth. In some embodiments, the AV 402 may not include human driver actuators (e.g., steering wheel, handbrake, foot brake pedal, foot accelerator pedal, turn signal lever, window wipers, etc.) for controlling the AV 402. Instead, the cabin system 438 can include one or more client interfaces, e.g., Graphical User Interfaces (GUIs), Voice User Interfaces (VUIs), etc., for controlling certain aspects of the mechanical systems 430-438.

AV 402 can additionally include a local computing device 410 that is in communication with the sensor systems 404-408, the mechanical systems 430-438, the data center 450, and the client computing device 470, among other systems. The local computing device 410 can include one or more processors and memory, including instructions that can be executed by the one or more processors. The instructions can make up one or more software stacks or components responsible for controlling the AV 402; communicating with the data center 450, the client computing device 470, and other systems; receiving inputs from riders, passengers, and other entities within the AV's environment; logging metrics collected by the sensor systems 404-408; and so forth. In this example, the local computing device 410 includes a perception stack 412, a mapping and localization stack 414, a planning stack 416, a control stack 418, a communications stack 420, an HD geospatial database 422, and an AV operational database 424, among other stacks and systems.

Perception stack 412 can enable the AV 402 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 404-408, the mapping and localization stack 414, the HD geospatial database 422, other components of the AV, and other data sources (e.g., the data center 450, the client computing device 470, third-party data sources, etc.). Perception stack 412 can detect and classify objects and determine their current and predicted locations, speeds, directions, and the like. In addition, the perception stack 412 can determine the free space around the AV 402 (e.g., to maintain a safe distance from other objects, change lanes, park the AV, etc.). The perception stack 412 can also identify environmental uncertainties, such as where to look for moving objects, flag areas that may be obscured or blocked from view, and so forth.

Mapping and localization stack 414 can determine the AV's position and orientation (pose) using different methods from multiple systems (e.g., GPS, IMUs, cameras, LIDAR, RADAR, ultrasonic sensors, the HD geospatial database 422, etc.). For example, in some embodiments, the AV 402 can compare sensor data captured in real-time by the sensor systems 404-408 to data in the HD geospatial database 422 to determine its precise (e.g., accurate to the order of a few centimeters or less) position and orientation. The AV 402 can focus its search based on sensor data from one or more first sensor systems (e.g., GPS) by matching sensor data from one or more second sensor systems (e.g., LIDAR). If the mapping and localization information from one system is unavailable, the AV 402 can use mapping and localization information from a redundant system and/or from remote data sources.

The planning stack 416 can determine how to maneuver or operate the AV 402 safely and efficiently in its environment. For example, the planning stack 416 can receive the location, speed, and direction of the AV 402, geospatial data, data regarding objects sharing the road with the AV 402 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 402 from one point to another. The planning stack 416 can determine multiple sets of one or more mechanical operations that the AV 402 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 416 can select from multiple backup plans to carry out. For example, while preparing to change lanes to turn right at an intersection, another vehicle may aggressively cut into the destination lane, making the lane change unsafe. The planning stack 416 could have already determined an alternative plan for such an event, and upon its occurrence, help to direct the AV 402 to go around the block instead of blocking a current lane while waiting for an opening to change lanes.

The control stack 418 can manage the operation of the vehicle propulsion system 430, the braking system 432, the steering system 434, the safety system 436, and the cabin system 438. The control stack 418 can receive sensor signals from the sensor systems 404-408 as well as communicate with other stacks or components of the local computing device 410 or a remote system (e.g., the data center 450) to effectuate operation of the AV 402. For example, the control stack 418 can implement the final path or actions from the multiple paths or actions provided by the planning stack 416. This can involve turning the routes and decisions from the planning stack 416 into commands for the actuators that control the AV's steering, throttle, brake, and drive unit.

The communication stack 420 can transmit and receive signals between the various stacks and other components of the AV 402 and between the AV 402, the data center 450, the client computing device 470, and other remote systems. The communication stack 420 can enable the local computing device 410 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 420 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 422 can store HD maps and related data of the streets upon which the AV 402 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal U-turn lanes; permissive or protected only right turn lanes; etc.). The traffic controls lane can include geospatial information of traffic signal lights, traffic signs, and other road objects and related attributes.

The AV operational database 424 can store raw AV data generated by the sensor systems 404-408 and other components of the AV 402 and/or data received by the AV 402 from remote systems (e.g., the data center 450, the client computing device 470, etc.). In some embodiments, the raw AV data can include HD LIDAR point cloud data, image data, RADAR data, GPS data, and other sensor data that the data center 450 can use for creating or updating AV geospatial data as discussed further below with respect to FIG. 2 and elsewhere in the present disclosure.

The data center 450 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. The data center 450 can include one or more computing devices remote to the local computing device 410 for managing a fleet of AVs and AV-related services. For example, in addition to managing the AV 402, the data center 450 may also support a ridesharing service, a delivery service, a remote/roadside assistance service, street services (e.g., street mapping, street patrol, street cleaning, street metering, parking reservation, etc.), and the like.

The data center 450 can send and receive various signals to and from the AV 402 and client computing device 470. These signals can include sensor data captured by the sensor systems 404-408, roadside assistance requests, software updates, ridesharing pick-up and drop-off instructions, and so forth. In this example, the data center 450 includes a data management platform 452, an Artificial Intelligence/Machine Learning (AI/ML) platform 454, a simulation platform 456, a remote assistance platform 458, a ridesharing platform 460, and map management system platform 462, among other systems.

Data management platform 452 can be a "big data" system capable of receiving and transmitting data at high velocities (e.g., near real-time or real-time), processing a large variety of data, and storing large volumes of data (e.g., terabytes, petabytes, or more of data). The varieties of data can include data having different structure (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 450 can access data stored by the data management platform 452 to provide their respective services.

The AI/ML platform 454 can provide the infrastructure for training and evaluating machine learning algorithms for operating the AV 402, the simulation platform 456, the remote assistance platform 458, the ridesharing platform 460, the map management system platform 462, and other platforms and systems. Using the AI/ML platform 454, data scientists can prepare data sets from the data management platform 452; select, design, and train machine learning models; evaluate, refine, and deploy the models; maintain, monitor, and retrain the models; and so on.

The simulation platform 456 can enable testing and validation of the algorithms, machine learning models, neural networks, and other development efforts for the AV 402, the remote assistance platform 458, the ridesharing platform 460, the map management system platform 462, and other platforms and systems. The simulation platform 456 can replicate a variety of driving environments and/or reproduce real-world scenarios from data captured by the AV 402, including rendering geospatial information and road infrastructure (e.g., streets, lanes, crosswalks, traffic lights, stop signs, etc.) obtained from the map management system platform 462; modeling the behavior of other vehicles, bicycles, pedestrians, and other dynamic elements; simulating inclement weather conditions, different traffic scenarios; and so on.

The remote assistance platform 458 can generate and transmit instructions regarding the operation of the AV 402. For example, in response to an output of the AI/ML platform 454 or other system of the data center 450, the remote assistance platform 458 can prepare instructions for one or more stacks or other components of the AV 402.

The ridesharing platform 460 can interact with a customer of a ridesharing service via a ridesharing application 472 executing on the client computing device 470. The client computing device 470 can be any type of computing system, including a server, desktop computer, laptop, tablet, smartphone, smart wearable device (e.g., smart watch, smart eyeglasses or other Head-Mounted Display (HMD), smart ear pods or other smart in-ear, on-ear, or over-ear device, etc.), gaming system, or other general purpose computing device for accessing the ridesharing application 472. The client computing device 470 can be a customer's mobile computing device or a computing device integrated with the AV 402 (e.g., the local computing device 410). The ridesharing platform 460 can receive requests to be picked up or dropped off from the ridesharing application 472 and dispatch the AV 402 for the trip.

Map management system platform 462 can provide a set of tools for the manipulation and management of geographic and spatial (geospatial) and related attribute data. The data management platform 452 can receive LIDAR point cloud data, image data (e.g., still image, video, etc.), RADAR data, GPS data, and other sensor data (e.g., raw data) from one or more AVs 402, UAVs, satellites, third-party mapping services, and other sources of geospatially referenced data. The raw data can be processed, and map management system platform 462 can render base representations (e.g., tiles (2D), bounding volumes (3D), etc.) of the AV geospatial data to enable users to view, query, label, edit, and otherwise interact with the data. Map management system platform 462 can manage workflows and tasks for operating on the AV geospatial data. Map management system platform 462 can control access to the AV geospatial data, including granting or limiting access to the AV geospatial data based on user-based, role-based, group-based, task-based, and other attribute-based access control mechanisms. Map management system platform 462 can provide version control for the AV geospatial data, such as to track specific changes that (human or machine) map editors have made to the data and to revert changes when necessary. Map management system platform 462 can administer release management of the AV geospatial data, including distributing suitable iterations of the data to different users, computing devices, AVs, and other consumers of HD maps. Map management system platform 462 can provide analytics regarding the AV geospatial data and related data, such as to generate insights relating to the throughput and quality of mapping tasks.

In some embodiments, the map viewing services of map management system platform 462 can be modularized and deployed as part of one or more of the platforms and systems of the data center 450. For example, the AI/ML platform 454 may incorporate the map viewing services for visualizing the effectiveness of various object detection or object classification models, the simulation platform 456 may incorporate the map viewing services for recreating and visualizing certain driving scenarios, the remote assistance platform 458 may incorporate the map viewing services for replaying traffic incidents to facilitate and coordinate aid, the ridesharing platform 460 may incorporate the map viewing services into the client application 472 to enable passengers to view the AV 402 in transit en route to a pick-up or drop-off location, and so on.

Figure 5:
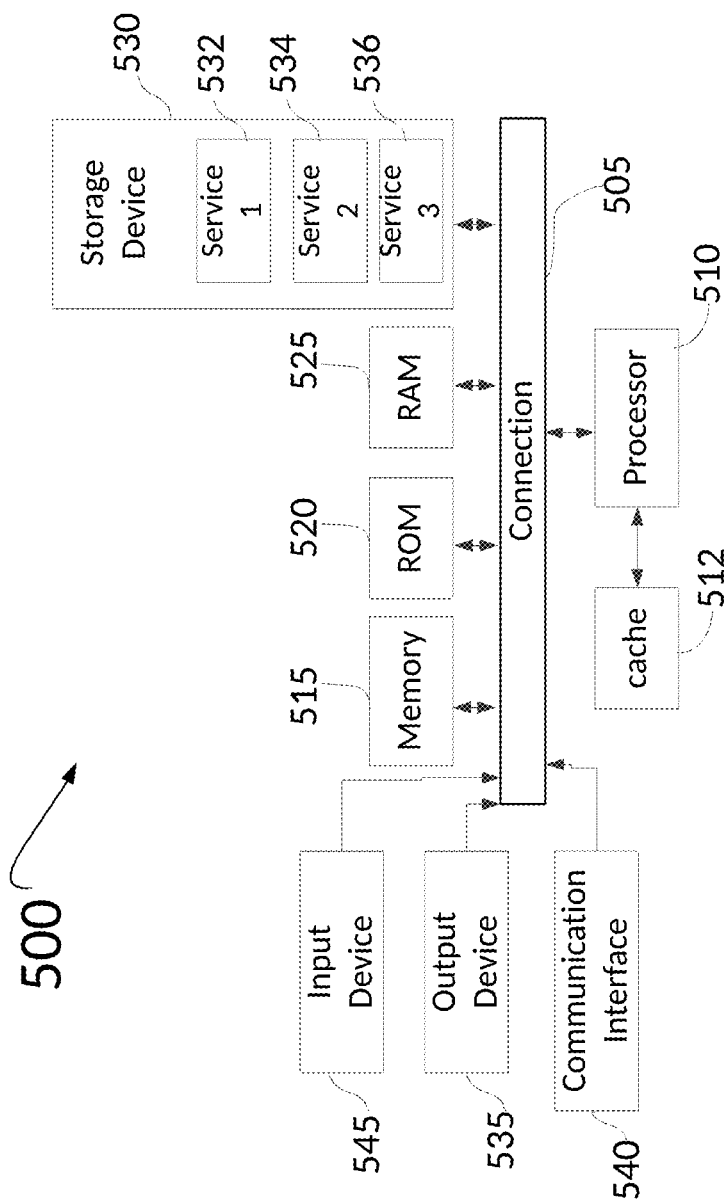
FIG. 5 illustrates an example processor-based system with which some aspects of the subject technology can be implemented.

FIG. 5 illustrates an example apparatus (e.g., a processor-based system) with which some aspects of the subject technology can be implemented. For example, processor-based system 500 can be any computing device making up internal (local) computing system 410, remote computing system 450, a passenger device executing the rideshare app 472, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments, computing system 500 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read-only memory (ROM) 520 and random-access memory (RAM) 525 to processor 510. Computing system 500 can include a cache of high-speed memory 512 connected directly with, in close proximity to, or integrated as part of processor 510.

Processor 510 can include any general-purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 540 may also include one or more Global Navigation Satellite System (GNSS) receivers or transceivers that are used to determine a location of the computing system 500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

Storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. An apparatus for identifying objects in an environment, comprising:
    at least one memory; and
    at least one processor coupled to the at least one memory, the at least one processor configured to:
    receive point cloud data comprising a plurality of radar points, wherein each of the radar points corresponds with a first object or a second object in an environment;
    generate a semantic label for individual radar points among the plurality of radar points;
    determine localization information for the individual radar points, and
    cluster the plurality of radar points based on both the semantic label for each of the radar points and the localization information, to generate a first point cloud cluster for the first object and a second point cloud cluster for the second object.

2. The apparatus of claim 1, wherein the plurality of radar points are clustered using a Density-based Spatial Clustering of Applications with Noise (DBSCAN) algorithm.

3. The apparatus of claim 1, wherein to generate the semantic label for each of the radar points, the at least one processor is configured to:
    provide the plurality of radar points to a machine-learning (ML) model.

4. The apparatus of claim 1, wherein the semantic label for each of the radar points identifies a correspondence with the first object or the second object.

5. The apparatus of claim 1, wherein the point cloud data is received from one or more autonomous vehicle (AV) radar sensors.

6. The apparatus of claim 1, wherein the point cloud data comprises Light Detection and Ranging (LiDAR) data.

7. A computer implemented method, comprising:
    receiving point cloud data comprising a plurality of radar points, wherein each of the radar points corresponds with a first object or a second object in an environment;
    generating a semantic label for each of the radar points;
    determining localization information for each of the radar points, and
    clustering the plurality of radar points based on both the semantic label for each of the radar points and the localization information, to generate a first point cloud cluster for the first object and a second point cloud cluster for the second object.

8. The method of claim 7, wherein the plurality of radar points are clustered using a Density-based Spatial Clustering of Applications with Noise (DBSCAN) algorithm.

9. The method of claim 7, wherein generating the semantic label for each of the radar points further comprises:
    providing the plurality of radar points to a machine-learning (ML) model.

10. The method of claim 7, wherein the semantic label for each of the radar points identifies a correspondence with the first object or the second object.

11. The method of claim 7, wherein the point cloud data is received from one or more autonomous vehicle (AV) radar sensors.

12. The method of claim 7, wherein the point cloud data comprises Light Detection and Ranging (LiDAR) data.

13. A non-transitory computer-readable storage medium comprising at least one instruction for causing a computer or processor to:
    receive point cloud data comprising a plurality of radar points, wherein each of the radar points corresponds with a first object or a second object in an environment;
    generate a semantic label for each of the radar points;
    determine localization information for each of the radar points, and
    cluster the plurality of radar points based on both the semantic label for each of the radar points and the localization information, to generate a first point cloud cluster for the first object and a second point cloud cluster for the second object.

14. The non-transitory computer-readable storage medium of claim 13, wherein the plurality of radar points are clustered using a Density-based Spatial Clustering of Applications with Noise (DBSCAN) algorithm.

15. The non-transitory computer-readable storage medium of claim 13, wherein to generate the semantic label for each of the radar points, the at least one instruction is configured to cause the computer or processor to:
    provide the plurality of radar points to a machine-learning (ML) model.

16. The non-transitory computer-readable storage medium of claim 13, wherein the semantic label for each of the radar points identifies a correspondence with the first object or the second object.

17. The non-transitory computer-readable storage medium of claim 13, wherein the point cloud data is received from one or more autonomous vehicle (AV) radar sensors.

* * * * *